United States Patent [19]

Bales

[11] 4,258,503

[45] Mar. 31, 1981

[54] THREE DIMENSIONAL TOPIARY FIGURE AND METHOD OF MAKING THE SAME

[76] Inventor: William T. Bales, 5955 Winslow, Whitehouse, Ohio 43571

[21] Appl. No.: 951,733

[22] Filed: Nov. 13, 1978

[51] Int. Cl.$^3$ .............................................. A41G 1/00
[52] U.S. Cl. ...................................... 47/58; 47/41.12; 428/16
[58] Field of Search ...................... 47/41, 41.11, 41.12, 47/41.13, 58

[56] References Cited

U.S. PATENT DOCUMENTS 3,630,811   12/1971   Radus .............................. 47/41.12 X

FOREIGN PATENT DOCUMENTS

| 2315245 | 1/1977 | France .................................... 47/41.12 |
| 8 | 6/1885 | Sweden .................................. 47/41.12 |
| 189338 | 5/1937 | Switzerland ........................... 47/41.12 |
| 1400409 | 7/1975 | United Kingdom .................... 47/41.12 |

*Primary Examiner*—Robert E. Bagwill
*Attorney, Agent, or Firm*—Wilson, Fraser, Barker & Clemens

[57] ABSTRACT

A three dimensional topiary figure and method of making the same is disclosed. The topiary figure includes a first and second skeletal member of a predetermined compatible shape joined together to produce an assembled, unitary, three dimensional shape typically in the shape of an animal or geometric design.

1 Claim, 7 Drawing Figures

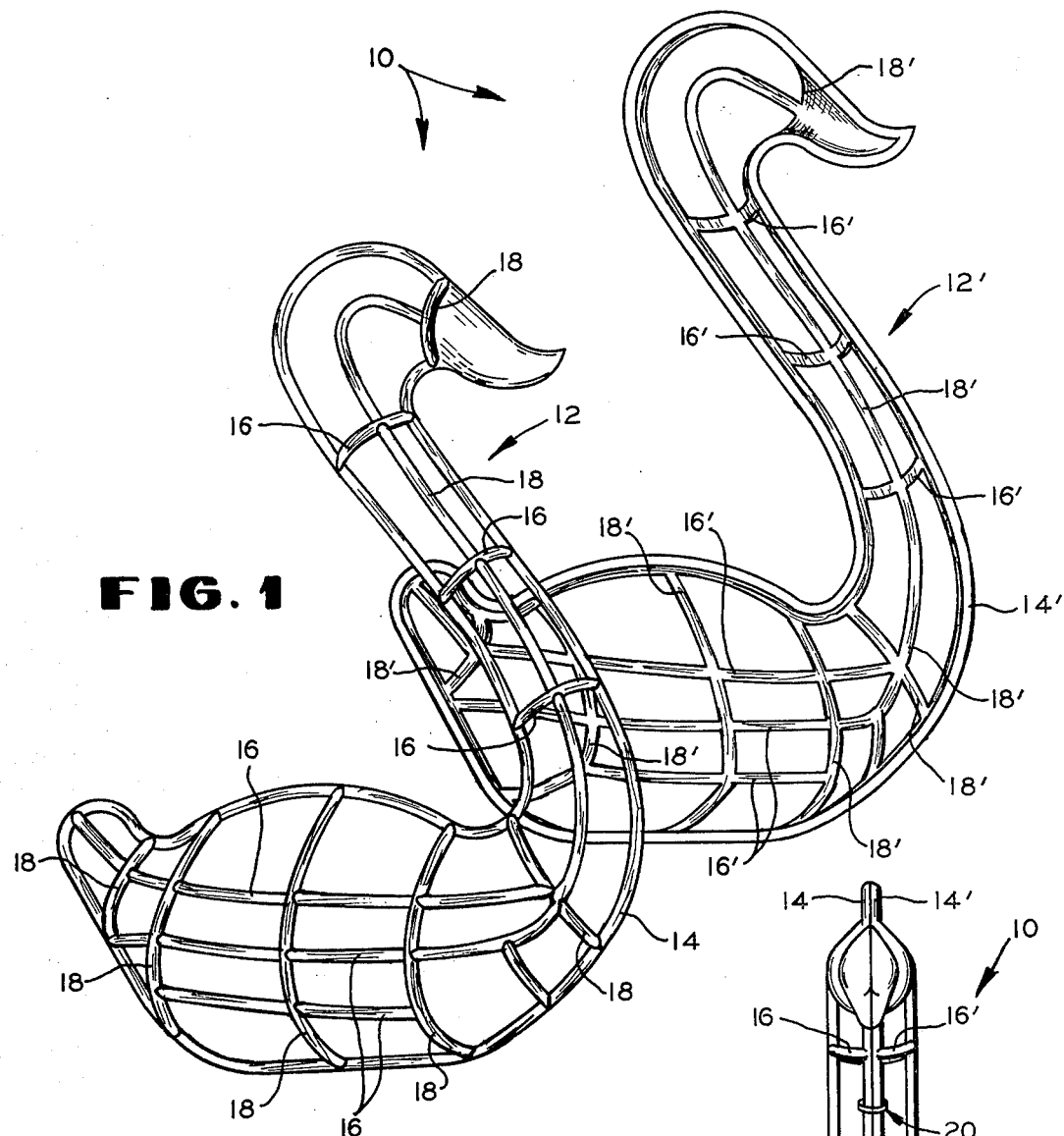
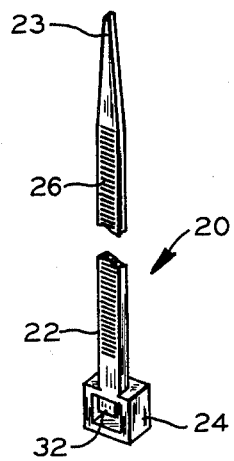
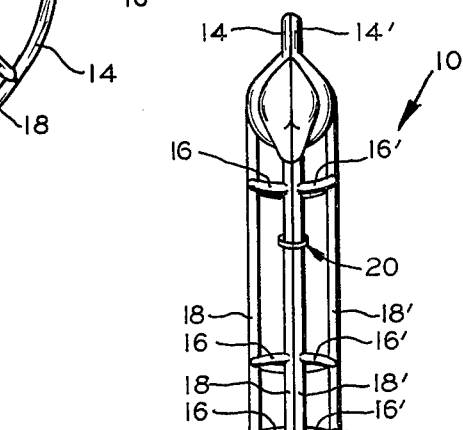
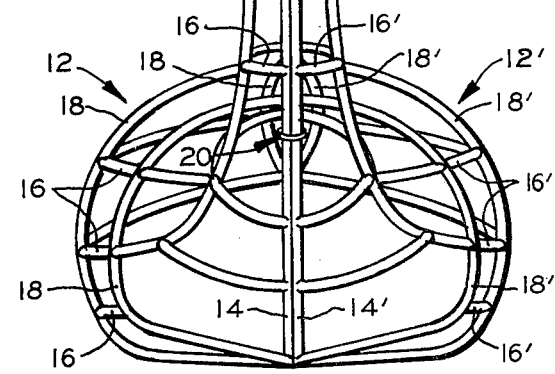

THREE DIMENSIONAL TOPIARY FIGURE AND METHOD OF MAKING THE SAME

BACKGROUND OF THE INVENTION

1. Field of the Invention

The present invention relates to planters and similar containers for holding living plants. The invention is more particularly related to unitary, three dimensional topiary figures which will support plants (or other greenery) in a geometric or animal shape. Such topiary figures are usually hollow and are a skeletal representation of the geometric or animal shape desired. The hollow interior zone of the topiary figure is defined by the skeleton and is filled with a medium capable of retaining moisture, such as moss, for example. Living plants are rooted into the medium and caused to grow in such a fashion that they cover the figure and produce a decorative, plant covered animal or geometric shape.

2. Description of the Prior Art

In the past, skeletal topiary figures have been fabricated from a wire network wherein wire strips are formed into the desired shape and welded or soldered together to assure that the desired shape is maintained. After the figure has been assembled, a quantity of medium capable of retaining moisture in order to support plant growth is inserted into the already formed figure. This requires the time consuming process of placing small amounts of the medium through the small openings in the wire network until the figure is substantially filled.

Since the figure is employed to maintain a medium for retaining moisture, the components thereof should typically be formed of treated metal stock to resist oxidation.

It is an object of the present invention to produce a three dimensional topiary figure which can be fabricated from a minimal number of parts which may be readily and economically filled with a plant growth support medium prior to the final assembly thereof.

It is another object of the present invention to produce a three dimensional topiary figure from a minimum of parts such that assembly is rapid and relatively inexpensive.

It is a further object of the invention to produce a three dimensional figure which may be readily formed of a plastic material.

SUMMARY OF THE INVENTION

The above, as well as other objects of the present invention, are achieved by a three dimensional topiary figure and method of fabricating same wherein the topiary figure includes cooperating skeletal members having a predetermined shape. The skeletal members are suitably joined together to produce an assembled, unitary, three dimensional form. The topiary figure according to the present invention is typically fabricated of a corrosion resistant material, usually a plastic material such as, for example, polystyrene, polyethylene or the like. The figure is formed of a few as two skeletal parts for rapid, low cost assembly.

BRIEF DESCRIPTION OF THE DRAWINGS

The above objects and advantages of the invention will become manifest to those skilled in the art from reading the following detailed description of the preferred embodiment of the invention when considered in the light of the accompanying drawings, in which:

FIG. 1 is an exploded perspective view of the skeletal members of a topiary figure showing the novel features of the present invention;

FIG. 2 is a perspective view of the fastening means employed in the assembly of the present invention;

FIG. 3 is a front elevational view of an assembled topiary figure;

DESCRIPTION OF THE PREFERRED EMBODIMENT

Figure 4:
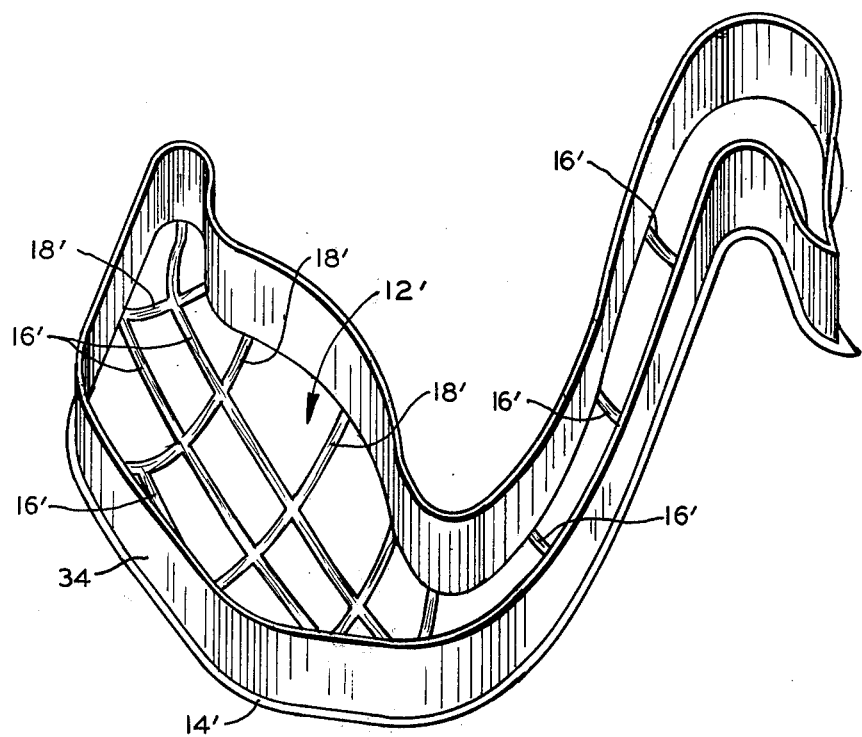
FIG. 4 is a perspective view of a skeletal member of the type illustrated in FIG. 1 and with a cooperating funnel-like member of a shape compatible with the skeletal member useful in inserting a moisture retaining medium.

Since throughout the following description and in the accompanying drawings, the skeletal members are substantially mirrored images of one another, prime reference numerals will be used in describing the cooperating member. Referring to FIG. 1, there is illustrated a three dimensional topiary figure 10 which includes a first skeletal member 12 and a second cooperating skeletal member 12'. Typically, the skeletal members 12 and 12' of the illustrated embodiment are mirrored images of one another and include continuous peripheral frame members 14 and 14'. The frame members 14 and 14' are in the shape of the animal or geometric figure which the topiary figure 10 is to represent.

Attached to the continuous peripheral frame members 14 and 14' are a plurality of generally horizontal ribs 16 and 16', respectively.

A plurality of generally vertical ribs 18 and 18' interconnect between the frame members 14 and 14' and the horizontal ribs 16 and 16' respectively cooperate with the frame members 14 and 14' respectively to produce separate halves of a three dimensional form generally corresponding to the form of a swan.

The topiary FIG. 10 of the illustrated embodiment is fabricated from a molded plastic. Any plastic which is suitably inexpensive and corrosion resistant will provide satisfactory results. It is an important feature of the invention that the topiary figure is constructed of a minimum of parts so that the assembly costs may be reduced to a minimum. Also important is the fact that low cost, corrosion resistant plastics are used to fabricate the topiary figure. The typical plastic materials used, such as polyethylene, polystyrene and the like, further lower the cost of the finished product as compared to the multipart metal structures known in the prior art. The intricate skeletal members 12 and 12' may be formed in a one step molding operation and then filled with plant growth medium and fully assembled in a few steps, further minimizing the cost of the final product. The lower cost of plastic molded parts, the lowered number of assembly steps and the corrosion resistant nature of the materials cooperate to produce the commercially competitive topiary figure in the invention.

In order to form a three dimensional topiary figure as illustrated in FIG. 3, the cooperating skeletal members 12 and 12' must be fastened together. A suitable means for fastening the members 12 and 12' is illustrated in FIG. 2 and generally indicated by reference numeral 20. The fastening means 20 includes a narrow flexible web portion 22 having a tip portion 23 at one end and a hollow portion 24 at the opposite end. A plurality of outwardly extending teeth 26 project from one surface of the web portion 22 along substantially the entire length thereof. A detent 32 is attached for engagement with the teeth 26 to depend from the inner surface of the hollow base 24.

The fastening means 20 is employed to secure the skeletal members 12 and 12' together as illustrated in FIG. 3. To assemble the topiary FIG. 10, the two skeletal members 12 and 12' are placed juxtaposition so that the adjacent surfaces of the frame members 14 and 14' intimately contact one another. Next, the fastening means 20 is employed to fasten the two skeletal members 12 and 12' together to form an assembled three dimensional topiary figure. Each fastening means 20 is looped around a portion of the two abutting frame members 14 and 14' so as to encircle the abutting frame members 14 and 14'. The tip 23 of the web portion 22 of the fastening means 20 is inserted through the hollow interior of the base 24 and pulled therethrough until the loop formed by the web portion 22 securely maintains the skeletal members 12 and 12' snugly together. Thereafter, the tip 22 is released and the detent 32 snugly contacts one surface of the one of the teeth so as to militate against any retrograde movement thereof. The excess length of the web portion 22 is then severed at the point where it exits from the hollow base 24.

In the preferred use of the three dimensional topiary FIG. 10, the interior thereof is filled with a medium capable of supporting plant growth. It has been found that a long fiber moss embodies the desired characteristics. As will be observed from FIG. 3, the skeletal members 12 and 12' when held together by the fastening means 20 define a hollow zone within the topiary FIG. 10 within which a medium such as moss for supporting plant growth can be disposed.

To fill the hollow interior of the topiary FIG. 10, a method may be employed in accordance with the following description. Initially, the skeletal member 12 is disposed on a surface with the open side exposed. Then a funnel-like member 34 of the same configuration as the skeletal member 12' is positioned within the confines of skeletal member 12' so that it fits snugly inside the inner walls of the frame member 14' thereof. The funnel-like member 34 may be of any desired thickness and of any suitable height. It is important to note that the funnel-like member 34 fits snugly within the inner wall of the frame member 14'.

After the funnel-like member 34 is properly inserted into the skeletal member 12', a quantity of the plant growth supporting medium 40 is placed into the funnel-like member 34 and allowed to fall, or if necessary is pushed into the hollow zone defined by the frame member 14', the horizontal ribs 16' and the vertical ribs 18'.

Since the plant growth supporting medium 40 is a moss, a substantial compacting of the moss into the hollow area may be desired.

Figures 5, 6:
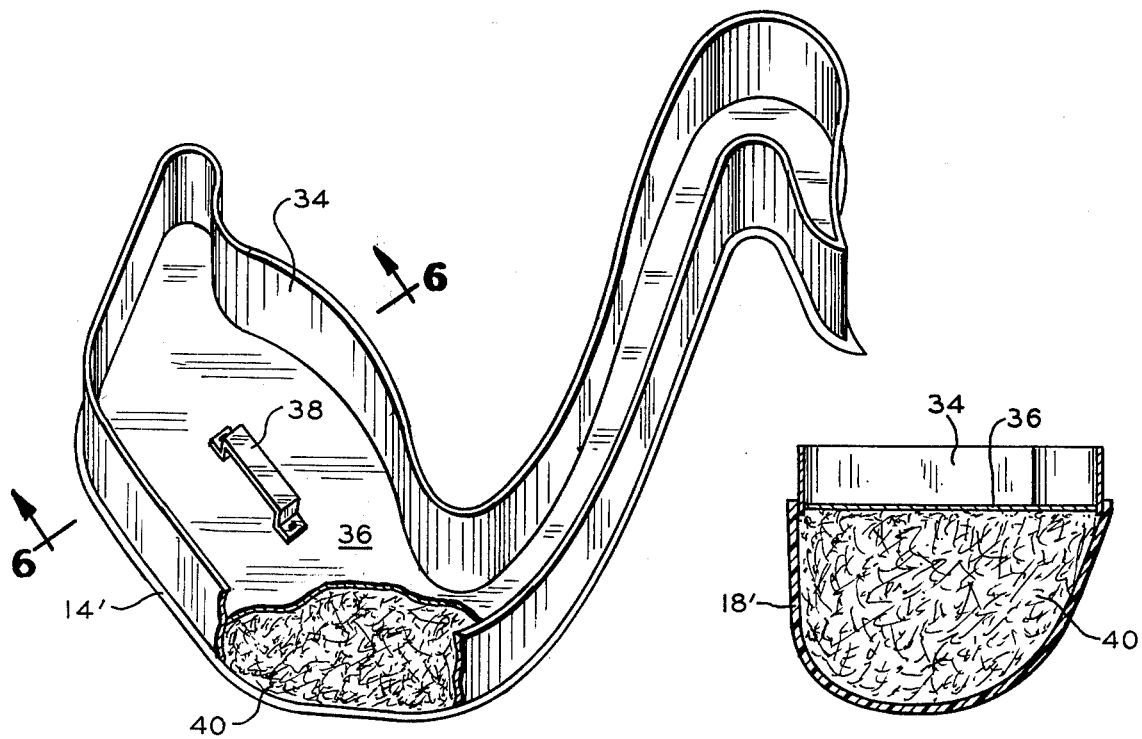
FIG. 5 is a perspective view of the assembly illustrated in FIG. 4 and a cooperating compatibly shaped device for compacting the moisture retaining medium.
FIG. 6 is a sectional view of the assembly illustrated in FIG. 5 taken along line 6—6 thereof.

After a quantity of moss 40 has been placed into the hollow zone of the skeletal member 12', a compacting element 36 having a handle 38 is placed inside the funnel-like member 34. The compacting element 36 is of a shape which is formed of the same general shape and slightly smaller than the funnel-like member 34 so that it can slide snugly into the funnel-like member 34 to compact the loosely packed moss 40 into the skeletal member 12'. As illustrated in FIG. 6, the moss 40 will be compacted to a level inwardly of the plane of the frame member 14', so that when the separate skeletal members 12 and 12' are brought together there will be no obstruction to the intimate contact of the frame members 14 and 14' due to the mass 40 protruding out of the hollow zone of the skeletal member 12'.

Figure 7:
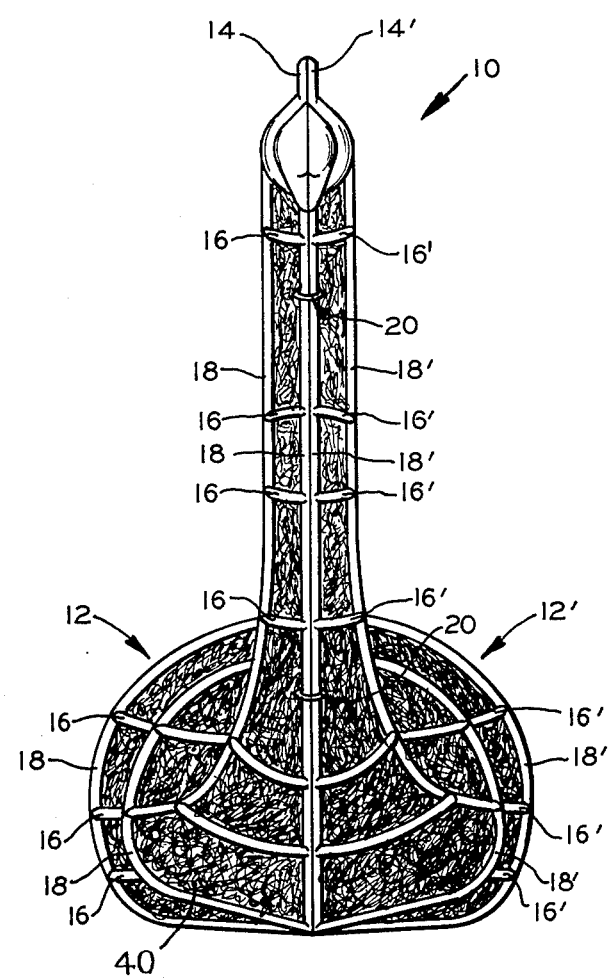
FIG. 7 is a perspective view of an assembled growth medium three dimensional topiary figure containing a moisture retaining medium.

The moss filled skeletal members 12 and 12' are pushed together, as illustrated in FIG. 7, so that the surfaces of the frame members 14 and 14' are in intimate contact with one another and then the fastening means 20 are placed around portions of the frame members 14 and 14' and tightened to fasten the skeletal members 12 and 12' together. It will be appreciated that other means may be employed to suitably join the skeletal members 12 and 12' together. Such other means include other types of clip members, adhesives, heat fusing, and the like.

Regarding the filling of the cooperating skeletal members with growth supporting medium, in some instances it may be useful to insert the skeletal members into a three dimensional mold. The mold facilitates the compacting of the medium into the skeletal member by preventing the medium from being forced through the spaces between the ribs.

In accordance with the provisions of the patent statutes, the principle and mode of operation of the invention have been explained and illustrated in a preferred embodiment. However, it must be understood that within the spirit and scope of the appended claims, the invention may be practiced otherwise than as specifically illustrated and described.

What is claimed is:

1. A method of forming a three dimensional topiary figure including the steps of:
    forming at least a first and second skeletal member of said figure in a predetermined shape;
    assembling said skeletal members together;
    fastening said skeletal members together to form a three dimensional unitary figure;
    disposing a funnel-like structure of a shape compatible within said skeletal members;
    placing a medium capable of supporting plant growth through said funnel and into said skeletal member; and
    forcing a compatibly shaped compacting element inwardly of said funnel-like structure to cause said medium to be compacted into said skeletal portion.

* * * * *